July 17, 1934. V. EGORENKOV 1,966,618
CONTOUR AND DEPTH GAUGE
Filed May 9, 1932
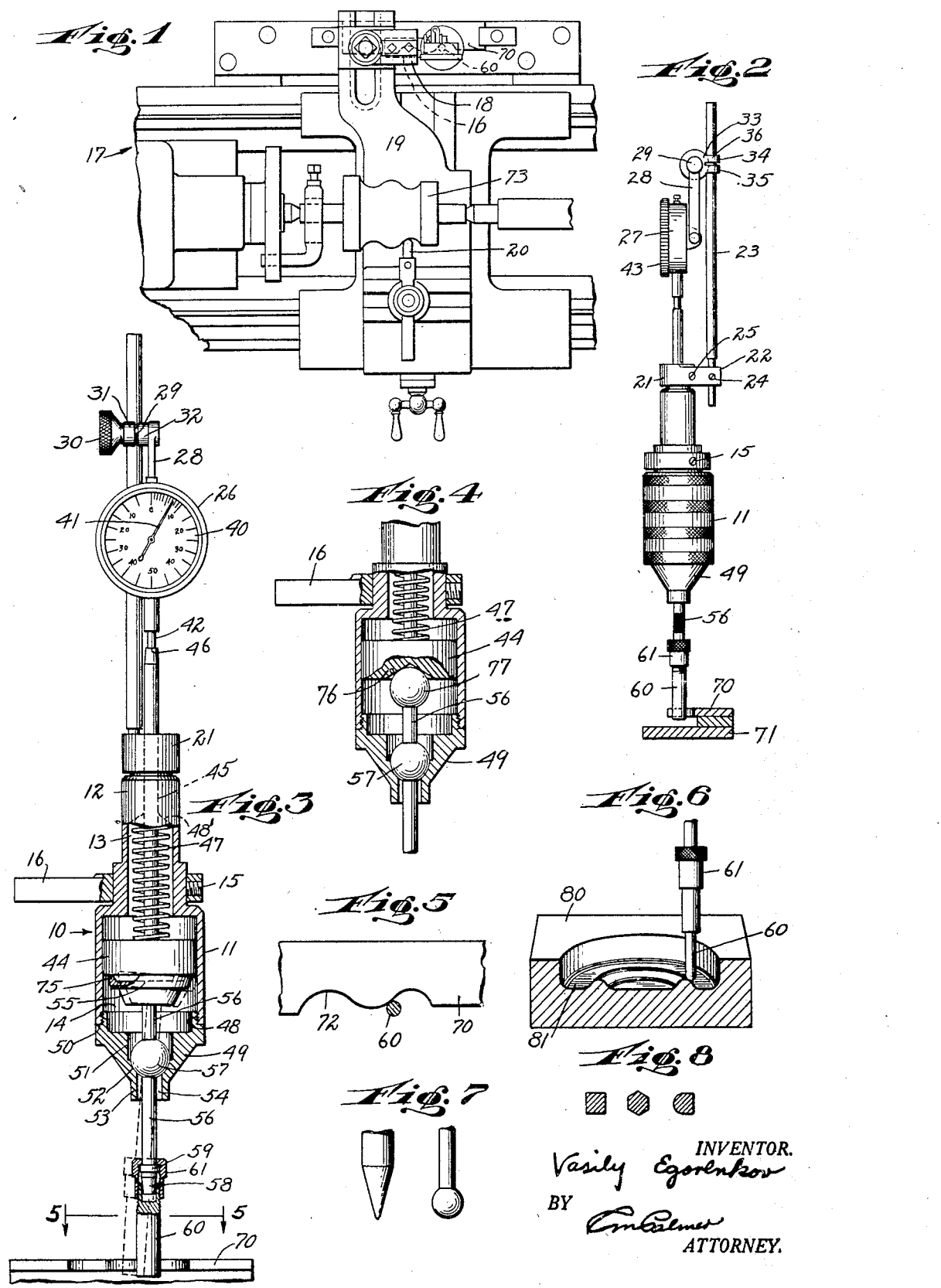

Patented July 17, 1934

1,966,618

UNITED STATES PATENT OFFICE 1,966,618

CONTOUR AND DEPTH GAUGE

Vasily Egorenkov, Brooklyn, N. Y., assignor of one-half to Frank N. Mariani, New York, N. Y.

Application May 9, 1932, Serial No. 610,095

8 Claims. (Cl. 33—172)

The present invention has to do with the art of gauging irregular shaped contours of various kinds of work in their process of manufacture and more particularly relates to an apparatus adapted to gauge depths and contours of impressions processed in the work although in a broader aspect the invention is not limited to gauging irregular shaped contours and may be advantageously utilized to speed up the production of certain classes of dies, moulds, punches, rolls of various shapes and additionally may be conveniently employed in association with an appropriately formed template for turning work to a special shape to conform to a particular and certain contour of the template.

In the process of shaping work to the desired contour of a thin master template or the like it has been customary to employ a gauge having a tracer terminal for following the contour of the template such that the cutting tool may be quickly and accurately set for coarse and fine cuts to be applied to the work to machine the latter down to a contour corresponding to that of the template. Hitherto various forms of apparatus were employed in the shaping of work to conform to the template, which apparatus usually employed a tracer terminal shiftable longitudinally thereof for gauging contours only.

An object of the invention is to provide an inexpensive rugged and readily operable apparatus for gauging special forms of work and having means for gauging the impressions formed in the work both as to contour and depth.

Another object of the invention resides in the provision of a contour gauge characterized by a tracer terminal having a universal connection adapted for displacement in all directions.

Another object of the invention comprehends the provision of a gauge in which the tracer terminal thereof is capable of being displaced on contact with an impression of the work either in a longitudinal direction for gauging the impression as to depth or alternatively shifted or tiltably displaced in gauging the contour or depth of the impression.

Another object of the invention is to provide a sensitive but rugged apparatus of the character alluded to which will stand up under considerable usage and which when disorganized or out of adjustment may be readily repaired and readjusted by the removal of and replacement of relatively few and inexpensive parts.

Other objects are in part obvious and in part pointed out hereinafter.

In one embodiment of the invention, the gauging apparatus is provided with a socket for receiving a spherical member from which extends a shank carrying a tracer terminal. Associated with the spherical member and movable in unison therewith and spaced therefrom is a dish shaped element for actuating a piston and its rod to operate the pointer of an indicator.

The spherical member in association with the socket forms a universal connection whereby the tracer terminal may be tilted from the vertical, causing in turn a deflection of the dish shaped element for displacing the piston and operating the dial of the indicator.

In another embodiment of the invention the piston cooperates with a spherical member to which motion is imparted from another but spaced spherical member disposed and guided in a suitable socket, the last mentioned member having means for carrying a tracer terminal which may be actuated upon contact with the template or in some instances with the work directly for operating the pointer of the indicating device.

The invention accordingly comprises, features of construction, combination of elements and arrangement of parts which will be exemplified in the construction hereinafter set forth and the scope of the application thereof will be pointed out in the appended claims.

For a clearer understanding of the invention attention is directed to the embodiments shown in the accompanying drawing in which:

Fig. 1 is a plan view of a portion of a lathe to which the gauge apparatus according to my invention has been applied.

Fig. 2 is a side elevational view of the gauge apparatus.

Fig. 3 is a front elevational view of the gauge apparatus partly in section, to show the interior mechanism.

Fig. 4 is a fragmentary view in sectional elevation of a modified gauging apparatus.

Fig. 5 is a fragmentary view of a template disposed in juxtaposition with respect to the tracer terminal which is shown in section and taken on the line 5—5 of Fig. 3.

Fig. 6 is a fragmentary view of the contour and depth gauge having its tracing terminal disposed in an irregular shaped impression or recess of a die or the like.

Fig. 7 shows fragmentary modifications of several tracer terminals and

Fig. 8 shows several modified cross sections of standards or posts which may be employed for slidably sustaining the indicating device.

The gauging apparatus according to the invention is generally designated 10 and comprises a hollow cylindrical casing or body 11. The upper portion of the casing is provided with a reduced integral extension 12 which has a longitudinally disposed bore 13 concentric and communicating with the interior cylindrical chamber 14 of the casing.

Encircling the lower portion of the extension 12 and suitably secured thereto against rotary movement by the adjustable and removable set screw 15 is a bracket arm 16 which extends longitudinally of a lathe generally denoted 17 (see Fig. 1), which arm is advantageously fastened to a block 18 adjustably disposed on the transverse carriage 19 to which the cutting tool 20 is appropriately adjusted and secured. With this arrangement, any movement of cutting tool 20, as the carriage 19 is displaced longitudinally of the lathe will cause the gauging apparatus to be correspondingly displaced in the same direction.

Associated with the upper reduced part of extension 12 and encompassing the same is a collar 21. This collar has a laterally extending ear or lug 22 which removably supports the vertical post or standard 23 by the set screw 24. As shown post 23 is provided with a cylindrical exterior surface but it is within the province of the invention to make it noncircular if desired for example, square, or polygonal or the like or alternatively to provide a portion of its curved longitudinal surfaces with an interconnecting flat face. The cross section of the several types of standards which may be used are shown in Fig. 8. In the form illustrated in Fig. 2, the collar 21 is prevented from moving relatively to the upper part of extension 12 by the set screw 25. This may be also accomplished by having the upper part of this extension and the collar of a noncircular contour if desired.

An indicating device generally denoted 26 is slidably sustained by the post 23. To this end the dial casing 27 of the indicating device has pivotally secured thereto a link 28. This link is provided with an offset integral shank 29 to which the adjustable set screw 30 is secured. Shank 29 passes through a pair of spaced resilient perforated ears 31 and 32 of a slidable one piece clamping instrumentality 33. Link 28 may be swung and adjusted to any position with respect to shank 29 or to the vertical post 23 by first loosening thumb member 30 to spread the ears 31 and 32 and release ear 32 from frictionally bearing against the upper portion of the link, which action permits the shank and its link to be swung to the desired position after which this position may be maintained by operating thumb member 30 to bring the ears 31 and 32 towards each other and consequently cause ear 32 again to frictionally abut the upper portion of the link and prevent shank 29 from turning.

The slidable clamping instrumentality 33 is also provided with another split portion defining spaced ears 34 and 35 which are perforated to slidably receiving post 23. By loosening the thumb member 30, ears 31 and 32 diverge causing their interconnecting yoke portions as 36 of which ears 34 and 35 are a part to be free of pressure and accordingly unclamp from the post 23. Thus the clamping instrumentality together with the indicating device may be first adjusted and subsequently clamped to any desired position relative to the rod or post 23.

In the form shown, the indicating device includes a graduated dial 40 cooperating with a rotatable pointer 41 which is operated through suitable mechanism by the reciprocable stem 42 projecting from the casing of the indicating device, which dial may be of a well known type wherein its rim 43 may be utilized for rotating it to any desired reading with respect to the pointer.

Disposed within the hollow cylinder 11 is a slidable piston 44 to which is attached an elongated rod 45 which passes through the extension 12, which is guided by the reduced part of the upper portion of the extension and which includes a top flat face 46 forming a seat for the lower face of the stem 42 of the indicating device.

A helicoidal spring 47 loosely encircles rod 45 and has one terminal portion confined in a socket 48' of extension 12 and its other terminal portion is seated on and abutting the piston 44.

The lower portion of the casing is internally threaded to detachably secure the threaded flange 48 of a substantially conical shaped cap or closure complement 49, which may be considered a part of the casing.

The cap is provided with an annular shoulder 50 adapted to limit its movement on the sides of the casing, a recess or socket 51, a curved seat 52 and a contracted portion 53 having the axially disposed opening 54.

Provision has been made for actuating the piston against the resistance of the spring 47 which encircles the piston rod in order that the latter may register on the indicating device the amount that the piston has been displaced. For this purpose, a piston actuating device has been provided which comprises a dish shaped member 55 fixedly connected to the upper portion of a rod 56 passing through a bored spheroidal shaped element 57, the latter being fixed to rod or shank 56 and is pivotally arranged on the corresponding curved seat 52 in the socket of the cap. The lower portion of rod 56 loosely extends through opening 54 and terminates in a tapered part 58 above which is provided an annular flange 59.

A tracing terminal 60 is secured to the tapered portion of rod 56. In this connection, terminal 60 is provided with a tapered socket for frictionally receiving the tapered portion 58. The rod 56 and terminal 60 are suitably held together by the adjustable coupling 61.

In the form illustrated in Figs. 3 and 5, the tracing terminal 60 is cylindrical but the invention is not limited to this specific form. Obviously contour tracing members other than those having a circular cross section may be used and quickly attached to the lower portion of rod 56.

For example, the tracing terminal 60 may have a cross section of the configurations illustrated in Fig. 8. The tracing terminals may also have a pointed or bulbous end as illustrated in Fig. 7.

In accordance with the invention, a template 70 is removably secured to a template table 71 and the latter is arranged so as to be stationary with respect to the gauging apparatus. The template is provided with a certain contour say, a series of undulations as 72 (see Fig. 5). Assume for example, it is proposed to turn out a piece of work or stock so as to have a corresponding undulating contour of the template. In Fig. 1, this work is designated 73 which has been mounted between a pair of spindles of the lathe. The work has been first cut rough, and then cut down fine. To test or gauge whether the work follows the contour of the gauge, the tool 20 is positioned so as to barely contact with a certain part of the work. If at this time the tracer 60 just barely contacts a corresponding point of the template.

the reading on the indicator device is zero. If, however, the work has been undercut there will be a reading on the indicating device, the amount needed to set the cutting tool before the contour of the work will conform to the template. In other words, if the work is undercut the needle or pointer will indicate how many thousandths of an inch it is necessary to adjust the cutting tool to cut off the required amount of the work to obtain a zero reading on the gauge. It is thus apparent that with the aid of the gauging device according to the invention it is possible to turn out work having special shapes very quickly. Of course the dial may be set for other readings other than to zero for different corresponding parts of the work and template.

The spherical member 57 in combination with its corresponding curved seat in the closure complement 49 provides a universal connection permitting the tracing terminal 60 to be tilted and deflected slightly from the normal and within a range of three hundred and sixty degrees. Accordingly various and complicated forms of templates may be traced as to contour in shaping and gauging work to corresponding contour.

Where the tracing terminal is deflected the spheroidal member 57 is slightly turned or pivoted on its seat, which causes the flared dish shaped member 55 to be tilted and thus elevate a portion of a marginal bead as 75 thereof to abut piston 44, causing the latter to be moved proportionately against the action of spring 47. Rod 45 is also lifted upwardly and operates stem 42 to turn the pointer of the indicating device corresponding to a tilted position of the tracer terminal as shown in Fig. 3.

When there is no pressure against the tracing terminal, it is perpendicular to the flat bottom plane of the piston and the spring is expanded. A slight pressure will cause the tracing terminal to be deflected and correspondingly contract the spring and the pointer will register the amount of deflection.

In the form shown in Fig. 4, the piston actuating device is similar in all respects to the species disclosed in Fig. 3, except that in the former, the piston is provided with a tapered reentrant recess 76. Secured to the upper part of the actuating rod 56 in the modification according to Fig. 4 is a spheroidal shaped member 77 which moves in unison with spheroidal shaped member 57, the latter forming one complement of the universal joint with the cap 49 and as is the case of the rod 56 in Fig. 3, the corresponding rod 56 of Fig. 4 also passes through and is secured to its spheroidal member 57. If, therefore, the rod 56, in Fig. 4 be tilted in any direction, the piston will be correspondingly displaced. In both of the modifications illustrated in Figs. 3 and 4, the needle of the indicating device may be operated without the tracing terminal of the piston actuating means being tilted or deflected away from the normal. In the case of the modification shown in Fig. 3, the annular bead 75 of the dish shaped member 55 lies against the contiguous flat face of the piston. If the tracer, that is, rod 56 and the terminal 60, is moved relatively towards the casing and without being tilted, the bead 75 bears against the piston which is displaced to operate the indicating device. Likewise, in the case of the form shown in Fig. 4, the indicating device may be operated when the tracer moves relatively towards the casing although not tilted away from the normal. In this instance, the tracer carrying the spaced spheroids 57 and 77 moves perpendicular to the horizontal bottom face of the piston and the spheroid 77 abuts the inclined faces 76 to displace the piston.

In both of the modifications, the helicoidal spring 77, operates the piston to hold the spheroidal members 57 against their seats such that their tracers are normally perpendicular to the horizontal lower face of their respective pistons.

With the several modifications of contour gauging apparatus disclosed, it is also possible to gauge depths of impressions or recesses, apart from the gauging of contour of a piece of work. For instance, in Fig. 6 a die or a piece of work is shown having an irregular shaped recess 81. The tracing terminal 60 may be employed to gauge the various depths of the bottom wall of the recess as well as the contour of its sides. In gauging the various depths of the recess, the tracing terminal 60 may be displaced but without being tilted from the normal to cause the piston to be correspondingly shifted in casing 11 and operate the indicating device as is well understood.

The gauging apparatus although shown in Fig. 1 in connection with a lathe is of course applicable for use with a milling or other shaping machine or with other suitable equipment utilized in the manufacture of certain kinds of forming or moulding dies or various kinds of dies or punches, which may be reproduced by contouring from a template.

While I have described my invention in detail and have referred to specific applications thereof, I do not intend that the invention herein disclosed shall be limited to such details or to such specific applications but intend that all matter contained in the above description or shown in the accompanying drawing shall be interpreted as illustrative and not in a limiting sense.

I claim:

1. A gauge apparatus, comprising, in combination, a casing having a socket therein, a piston within the casing, a member movable with the piston and extending within and beyond the casing, a piston actuating device comprising an elongated element disposed in part within and in part beyond the casing, the element having an enlargement juxtaposed with respect to the piston and a portion seated in the socket of the casing, the part of the element extending beyond the casing constituting a tracer, a spring encircling said member to urge the piston to hold said portion against its socket and an indicating device slidably and adjustably mounted with respect to the casing, the indicating device being responsive to retraction of said portion away from its seat and to the displacement of said member.

2. A gauge apparatus, comprising, in combination, a casing, a piston disposed therein, a piston actuating device comprising an elongated member having a flared instrumentality connected to the upper portion thereof and an intermediately disposed spheroidal element providing a universal connection with a portion of the casing, the member having a free tracing portion extending through and beyond the casing, a piston rod, spring means interposed between the piston and one wall of the casing and encircling said rod, a post secured to the casing, and an indicating device slidably and adjustably mounted on said post and having a portion thereof seated on said piston rod.

3. A gauge apparatus, comprising, in combination, a casing, a piston disposed therein, a piston actuating device including an elongated member having a relatively wide upper portion and an intermediately disposed spheroidal element providing a universal connection with a portion of the casing, the member having a tracing portion extending through and below the casing, a piston rod, spring means interposed between the piston rod and one wall of the casing and encircling said rod, a post secured to the casing, an indicating device carried by the post and seated on said rod, and the aforementioned tracing portion having a terminal detachably secured thereto.

4. A gauge apparatus, comprising, in combination, a casing having a socket, a piston actuating device including an elongated member carrying spaced spheroids one of which is seated in the socket of the casing, the elongated member having a tracing element extending from the last mentioned spheroid and projecting beyond the casing, a piston having a recess with tapering sides, the other of said spheroids forming a seat for said sides, means to urge said sides against associated curved walls of said socket, an upstanding free element secured at one end of the casing, an indicating device shiftably mounted on said element and responsive to the displacement of said piston, a gauging terminal removably connected to said tracing element, the terminal being depressible longitudinally of the casing or universally shiftable for operating the piston and said indicating device.

5. A gauge apparatus comprising in combination a casing having a socket at one end thereof, a piston slidably disposed within the casing, a member movable with the piston and extending within and beyond the casing, a piston actuating device having a rim and an elongated depending element disposed in part within and in part beyond the casing, the element having a spheroidal portion arranged in said socket, the part of the element extending beyond the casing constituting a tracer, a spring encircling said member to urge a flat face of the piston against said rim and hold said portion in its socket, and an indicating device slidably and adjustably mounted with respect to the casing, the indicating device being responsive to the retraction or tilting of said tracer.

6. A gauge apparatus comprising, in combination, a casing having a socket at one end, a piston slidably disposed within the casing, a piston rod movable with the piston and extending in part within and in part outside of the casing, a piston actuating device comprising at its upper end a flared enlargement including an annular rim, an element depending from said enlargement disposed in part within and in part beyond the casing, the element having a spheroidal portion seated in said socket, the part of the element beyond the casing constituting a tracer, a spring encircling said rod to normally urge a flat face of the piston against said rim and hold said portion in its socket, an indicating device associated with the casing and having a portion seated on said rod and responsive to displacement of said piston upon either tilting or retraction of said tracer.

7. The gauge apparatus according to claim 6 characterized in that the part of the element disposed outside of the casing includes a flange from which is loosely suspended a sleeve encircling a free portion of said element which cooperates with an extension having means for interconnection with said sleeve.

8. The gauge apparatus according to claim 6 further characterized in that the part of the element disposed outside of the casing includes a flange and a tapered free portion, a sleeve shiftably disposed longitudinally of and encircling said free portion, an extension having a recess to receive said free portion and means for interconnection with said sleeve, said flange forming a stop for one portion of said sleeve.

VASILY EGORENKOV.